(12) United States Patent
Karatajew et al.

(10) Patent No.: US 12,536,634 B2
(45) Date of Patent: Jan. 27, 2026

(54) METHOD OF IMAGING A WIND TURBINE ROTOR BLADE

(71) Applicant: Siemens Gamesa Renewable Energy A/S, Brande (DK)

(72) Inventors: Maxim Karatajew, Celle (DE); Bohdan Kulyk, Lviv (UA); Lars Holm Nielsen, Noerre Snede (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 415 days.

(21) Appl. No.: 17/911,195

(22) PCT Filed: Mar. 4, 2021

(86) PCT No.: PCT/EP2021/055518
§ 371 (c)(1),
(2) Date: Sep. 13, 2022

(87) PCT Pub. No.: WO2021/185593
PCT Pub. Date: Sep. 23, 2021

(65) Prior Publication Data
US 2023/0105991 A1   Apr. 6, 2023

(30) Foreign Application Priority Data

Mar. 17, 2020   (GB) .............................. a 2020 01890

(51) Int. Cl.
*G06T 7/11* (2017.01)
*G06T 3/40* (2006.01)
*G06T 7/00* (2017.01)

(52) U.S. Cl.
CPC .............. *G06T 7/0002* (2013.01); *G06T 3/40* (2013.01); *G06T 2207/20084* (2013.01); *G06T 2207/30168* (2013.01)

(58) Field of Classification Search
CPC ........... G06T 2207/30164; G06T 17/00; G06T 2207/20101; G06T 17/20; G06T 19/00;
(Continued)

(56) References Cited

U.S. PATENT DOCUMENTS

2011/0128388 A1* 6/2011 Pai ........................ G01B 11/03
348/187
2012/0253697 A1   10/2012 Frankenstein et al.
(Continued)

FOREIGN PATENT DOCUMENTS

CN        101354784 A  *  1/2009
WO   WO-2019048597 A1 *  3/2019 ............. F03D 17/00

OTHER PUBLICATIONS

International Search Report and Written Opinion for PCT/EP2021/055518, issued on Jun. 21, 2021.

*Primary Examiner* — Quan M Hua
(74) *Attorney, Agent, or Firm* — Schmeiser, Olsen & Watts LLP (57) ABSTRACT

A method of imaging a wind turbine rotor blade is provided, which method includes the steps of controlling a camera to capture a plurality of images, each image showing a part of the rotor blade surface; augmenting each image with geometry metadata; generating a three-dimensional model of the rotor blade from the image metadata; and re-projecting the images on the basis of the three-dimensional model to obtain a composite re-projection image of the rotor blade. Also provided is a wind turbine rotor blade imaging arrangement.

18 Claims, 7 Drawing Sheets

(58) Field of Classification Search
CPC . G06T 19/20; G06T 2207/10068; G06T 7/62; G06T 7/0004; G06T 2200/08; G06T 2207/20081; G06T 2207/20084; G06T 2207/20132; G06T 7/33; G06T 7/80; G06T 15/04; G06T 17/05; G06T 2219/2004; G06T 2219/2016; G06T 7/30; F03D 17/00; G01N 2021/8887; G01N 21/8851; G01N 21/9515; G01N 21/954; G01N 35/0099; G06N 3/0464

See application file for complete search history.

(56) References Cited

U.S. PATENT DOCUMENTS

| | | |
|---|---|---|
| 2018/0003161 A1 | 1/2018 | Michini et al. |
| 2018/0094537 A1* | 4/2018 | Pulisciano ............. H04N 13/20 |
| 2018/0158211 A1* | 6/2018 | Ghazizadeh .......... G06T 7/0014 |
| 2020/0160616 A1* | 5/2020 | Li ........................ G06V 10/776 |

* cited by examiner

METHOD OF IMAGING A WIND TURBINE ROTOR BLADE

CROSS-REFERENCE TO RELATED APPLICATIONS

This application claims priority to PCT Application No. PCT/EP2021/055518, having a filing date of Mar. 4, 2021, which claims priority to UA Application No. A202001890, having a filing date of Mar. 17, 2020, the entire contents both of which are hereby incorporated by reference.

FIELD OF TECHNOLOGY

The following describes a method of imaging a wind turbine rotor blade, and a wind turbine rotor blade imaging arrangement.

BACKGROUND

Wind turbine rotor blades are exposed to harsh environmental conditions and may suffer impact damage from hailstones, sand or other airborne particles. It is important to repair minor damage to a rotor blade exterior in order to avoid more severe damage. For example, water trapped in a small fissure or crack can expand on freezing, exacerbating the damage. Furthermore, even minor damage in the outer skin of the rotor blade can act as an unintended target for lightning strikes, which can result in very severe or even catastrophic damage. For these reasons, it is important to regularly inspect the outer surface of a rotor blade in order to identify surface anomalies.

However, the dimensions of a present-day rotor blade (which can easily have a length in excess of 70 m) rule out the possibility of imaging the entire rotor blade using a commodity camera. This is because the camera would have to be far away in order to include the entire rotor blade in its field of view, and the ensuing resolution would be too poor to allow identification of damage in the order of a few millimeters.

Various camera-based inspection techniques have been proposed for the detection of damage to a rotor blade exterior. For example, a camera may be mounted on a track (on the ground or on the deck of a marine vessel) and made to slide back and forth while capturing images of a rotor blade, which can also be pitched during the imaging sequence so that all aspects of the rotor blade surface can be imaged. Alternatively, a drone can be controlled to hover about a rotor blade while collecting images of the surface. In each case, some "image-stitching" technique is used to identify common image regions in which to join the images in order to obtain an overall picture of the rotor blade surface. The known image-stitching techniques can be used to provide a basis from which to "map" a defect identified in an image to its position on the rotor blade. However, the accuracy of the known image-stitching techniques is limited, particularly for large rotor blades. Some degree of error is unavoidable when stitching neighboring images, and the accumulated error can lead to very large discrepancies between the actual position of a defect and its "localized" coordinates. This can result in significant costs due to delays when an on-site maintenance crew cannot find a defect at the reported location and must search for it.

SUMMARY

An aspect relates to an improved way of imaging a wind turbine rotor blade.

According to embodiments of the invention, the method of imaging a wind turbine rotor blade comprises the steps of controlling a camera to capture a plurality of images, each image showing a portion of the rotor blade surface, and augmenting each image with geometry metadata. The expression "geometry metadata" as used in the context of embodiments of the invention shall be understood to mean data that describes a spatial relationship between the camera and the part of the rotor blade that is being imaged. The inventive method comprises the further steps of generating a three-dimensional model of the rotor blade from the image metadata, and re-projecting the images on the basis of the three-dimensional model to obtain a composite re-projection image of the rotor blade.

An image may show only a region of the rotor blade (the imaged surface region fills the image), or may also show background (e.g., parts of the sky, the ground, the sea, the wind turbine tower, the hub). Each image may be regarded as a rectangular array of pixels. However, the plane of the imaged rotor blade region will generally be different from the image plane, depending on the orientation of the rotor blade, and also depending on the viewing angles of the camera. Furthermore, even two successive images (showing overlapping regions of the rotor blade) may be taken at different viewing angles, at different orientations, and with different fields of view. For these reasons, and in view of the fact that an imaged portion of a rotor blade surface is generally devoid of any distinguishing pattern, it is difficult to accurately connect such images using conventional image stitching methods.

The inventive method overcomes this problem by making use of data that can be supplied by the camera system. This "metadata" is stored along with each image. The metadata is used to generate a rough 3D model of the rotor blade, and then, knowing the viewing angles and distance-to-object for each image, it is possible to re-project each image at the same scale and viewing angle to obtain a composite image that appears as though it was captured in a single shot.

An advantage of the inventive method is that by generating a three-dimensional model of the rotor blade from the image metadata, and re-projecting the images on the basis of that three-dimensional model, it is possible to obtain a very accurate composite image of the rotor blade.

This re-projected image of the rotor blade may then be used for any purpose, for example to identify a defect in the rotor blade surface. Because the re-projected image is accurate, the accuracy of defect localization is vastly improved, and the size or area of a defect can be determined more accurately also. The inventive method does not simply produce a cumulative image of the rotor blade by stitching all images together in the usual manner. Instead, as indicated above, the inventive method uses the accurate geometry metadata of all images to first generate a three-dimensional model of the rotor blade. This accurate three-dimensional model then provides a reference frame from which to carry out a re-projection of the images. It is then possible to accurately relate any pixel of a specific image to a point on the re-projected composite image of the rotor blade, and therefore also to a point on the actual rotor blade.

According to embodiments of the invention, the wind turbine rotor blade imaging arrangement comprises a camera configured to capture a plurality of images, each image showing a part or portion of the rotor blade surface; a number of metadata generators for generating geometry metadata for an image; and an image augmentation module configured to augment each image with geometry metadata. From the geometry metadata of a set of images, a model generation unit of the imaging arrangement generates a three-dimensional model of the rotor blade from the image metadata. The inventive imaging arrangement further comprises a reprojection module configured to re-project the images on the basis of the three-dimensional model to obtain a composite re-projection image of the rotor blade.

An advantage of the inventive imaging arrangement is that it can be realized at relatively low cost. It can be realized without any dedicated hardware components and can be assembled from off-the-shelf components. Various units or modules of the inventive imaging arrangement—in particular the image augmentation module, the model generation unit and the mapping module—can be completely or partially realized as software modules running on a processor of a controller, for example a camera controller. A realization largely in the form of software modules can have the advantage that applications already installed on an existing system can be updated, with relatively little effort, to install and run the steps of the inventive method.

Embodiments and features of the invention are given by the dependent claims, as revealed in the following description. Features of different claim categories may be combined as appropriate to give further embodiments not described herein.

A wind turbine generally comprises several rotor blades, usually three. In the following, without restricting embodiments of the invention in any way, it may be assumed that, during an image collection sequence, the camera of the inventive imaging arrangement is controlled to collect or capture multiple images of a single rotor blade, for example 50 images of a rotor blade face (e.g., pressure side, suction side, leading edge).

The geometry metadata can be obtained in various ways. In an embodiment of the invention, the imaging arrangement comprises a position tracking unit configured to obtain the camera spatial coordinates for the image augmentation module. A position tracking unit can be realized using accelerometers, a navigation device using a GPS tracking unit, etc. These spatial coordinates are in a well-defined camera coordinate system, for example an XYZ-coordinate system with a suitable choice of origin and principle axes. The position tracking unit can continually establish the camera's spatial coordinates, and these are reported to the image augmentation module at the instant at which an image is captured.

In a further embodiment of the invention, the imaging arrangement comprises a viewing angle tracking unit configured to obtain one or more camera viewing angles for the image augmentation module. This can be done, for example, using a gimbal mount such as a 3-axis gimbal that allows rotation of the camera around three orthogonal axes, and the viewing angle tracking unit can report the Euler angles (yaw, pitch, and roll angles) of the camera. The viewing angle tracking unit can continually establish the orientation of the camera's optical axis within the camera coordinate system, and this information is reported to the image augmentation module at the instant at which an image is captured.

In an embodiment of the invention, the imaging arrangement comprises a range-finding unit that is configured to measure the distance between camera and rotor blade surface. This can be done using a Lidar rangefinder system, for example, or by using a camera that is equipped with a laser rangefinder. The rangefinder can continually establish the distance from the camera to the rotor blade surface, and this distance is reported to the image augmentation module at the instant at which an image is captured.

The camera is "mobile" in that it can be moved about in order to collect a suitable number of images. In an embodiment of the invention, the camera is carried by a drone which can be made to hover about the rotor blade while collecting images of the rotor blade surface. In an alternative embodiment of the invention, the camera is mounted on a rigid track, e.g., a ground-mounted track near the base of an onshore wind turbine; a vertical track mounted to a wind turbine tower; a track installed on a marine vessel in the case of an offshore wind turbine, etc.

The inventive imaging arrangement also comprises a camera controller that is configured to adjust parameters such as the position of the camera, the viewing angle of the camera, the focal length of the camera etc., in order to capture a sufficient number of images to be able to perform imaging over a desired region of the rotor blade, over one side of the rotor blade, or over the entire rotor blade surface.

With the geometry metadata described above, the inventive imaging arrangement then proceeds with the intermediate step of generating a 3D model of the rotor blade, for example it can create a 3D boundary model from the metadata.

In an embodiment of the invention, the step of re-projecting the images is assisted by a neural network to identify how an image should be aligned relative to a fixed point of reference such as the root end of the rotor blade, i.e., the neural network is used to assist in automatically determining the orientation of an image relative to the blade root.

In an embodiment of the invention, the neural network is pre-trained using a plurality of annotated datasets. Such annotated datasets can initially have been created manually, and can be used to train a deep learning neural network. With each imaging procedure, the neural network can learn and adapt, so that the accuracy of the model generation step can increase further over time.

As indicated above, the images of the rotor blade regions may be defined relative to a main reference frame or "real-world" reference frame containing the physical rotor blade. This main reference frame may be a Cartesian coordinate system with X, Y and Z principle axes. These three axes can be assigned in any convenient way, for example letting the origin be at the base of the tower and one principle axis aligned with the tower vertical axis. Such a reference frame definition may be suitable if the camera is carried by a drone. In an imaging arrangement that uses a supporting structure such as a track or mount to support the camera, an axis of the supporting structure itself can serve as a principle axis of the reference system.

The three-dimensional model may be defined in terms of its own coordinate system or reference frame, for example a Cartesian coordinate system with its origin at the midpoint of the innermost circular root edge, and a principle axis that defines a longitudinal axis of the rotor blade model. The model reference frame may therefore be independent of the main reference frame.

Depending on the manner in which the camera was controlled, the images may be captured at different distances or scales, i.e., some images may be more "close-up" than others. The images of one face of the rotor blade can all be at different scales, since the distance between camera and rotor blade can be different for each image. Furthermore, the images may all be taken at different viewing angles. In a "worst case" scenario from an image-stitching point of view, it may be that no two images are at the same scale, and no two images were captured at the same viewing angles. To overcome this, the inventive method comprises a step of re-projecting the images by applying a homograph matrix to each image. The effect of the homograph matrices is that each image will be re-projected onto the same plane and at a uniform scale, so that each re-projected image will appear to have been obtained at the same distance from a principle axis of the 3D model, i.e., at the same distance from a principle axis of the rotor blade.

A composite re-projection image can be used for various purposes. For example, it can be used to view a complete face of the rotor blade on a computer monitor. Alternatively, several composite re-projection images—of the leading edge, pressure side, suction side and trailing edge—can be combined, giving the viewer the impression of looking at a single image of a complete "flattened" rotor blade.

A particularly useful aspect of the rotor blade model is that it allows any point in any image to be related to an "actual" point on the rotor blade surface. In other words, the position of a pixel in an image can be mapped to unique coordinates in the model reference frame. This allows a defect on the surface of the rotor blade to be identified by applying suitable image processing algorithms, for example algorithms that can detect color anomalies, edge anomalies, etc. Such algorithms will be known to the skilled person and need not be described in detail here. Any anomaly or "finding" detected by such an algorithm can be reported to a user along with the coordinates of the rotor blade reference frame. For example, the user may receive a message such as "possible surface defect at 25 m from root end, on suction side, 3 cm from leading edge". Such a defect report may also indicate the length, width or area of the defect.

Most defects (pitting, fissures, peeling outer paint layer etc.) are generally found near the leading edge in the outer blade regions. This is because the rotational velocity of the rotor blade increases in the direction of the tip, and the impact speed of particles increases accordingly. The inventive method can identify the location of a defect to a favorably high degree of accuracy, since it is based on the insight that a camera system can provide very accurate metadata. The aspect of the invention is also achieved by a computer program product (non-transitory computer readable storage medium having instructions, which when executed by a processor, perform actions) with a computer program that is directly loadable into the memory of a control unit of the imaging arrangement, and which comprises program units to perform the steps of the inventive method when the program is executed by the control unit.

BRIEF DESCRIPTION

Some of the embodiments will be described in detail, with reference to the following figures, wherein like designations denote like members, wherein.

DETAILED DESCRIPTION

Figure 1:
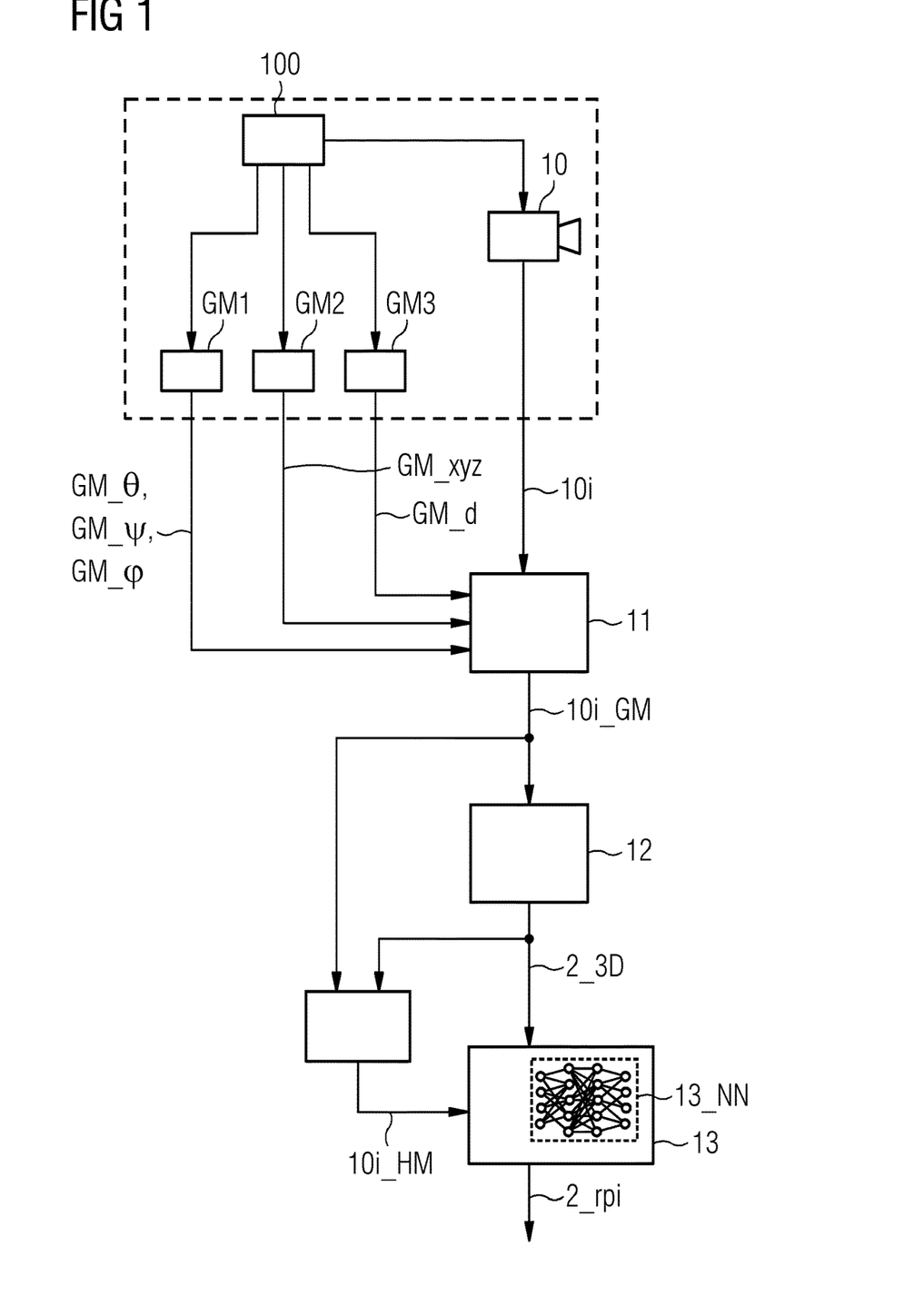
FIG. 1 is a simplified block diagram of an embodiment of the inventive wind turbine rotor blade imaging arrangement.

FIG. 1 is a simplified block diagram of an embodiment of the inventive imaging arrangement 1 and shows a camera 10 that can capture images 10$i$ of a rotor blade (not shown). The camera 10 is part of an assembly that also comprises a viewing angle tracking unit GM1 that outputs the camera viewing angles GM_$\theta$, GM_$\psi$, GM_$\varphi$ at the instant an image 10$i$ is captured, a position tracking unit GM2 that outputs the camera spatial coordinates GM_xyz at the instant an image 10$i$ is captured, and a range-finding unit GM3 that measures the distance GM_d between camera 10 and rotor blade surface at the instant an image 10$i$ is captured. An image augmentation module 11 augments each image 10$i$ with its geometry metadata GM_xyz, GM_$\theta$, GM_$\psi$, GM_$\varphi$, GM_d and forwards the augmented image 10$i$ GM to a model generation unit 12.

After receiving a sufficient number of augmented images 10$i$_GM, the model generation unit 12 generates an accurate three-dimensional model 2_3D of the rotor blade from the geometry metadata GM_xyz, GM_$\theta$, GM_$\psi$, GM_$\varphi$, GM_d of the images 10$i$.

The reference system of the 3D model 2_3D is used as a basis from which to compile a homograph matrix 10$i$ HM for each image 10$i$. Each image 10$i$ of the plurality of images then undergoes a re-projection by its homograph matrix 10$i$ HM. This can be done using a suitable choice of available mathematical algorithms. The result is a set of images all at the same scale, and all of which appear to have been captured from the same camera angle and at the same distance to the rotor blade. A neural network 13 NN can assist in identifying which "end" of an image is closest to a reference such as the rotor blade root end. The result of the image processing is a composite re-projection image 2_rpi showing the entire surface that was captured by the plurality of images.

Figure 2:
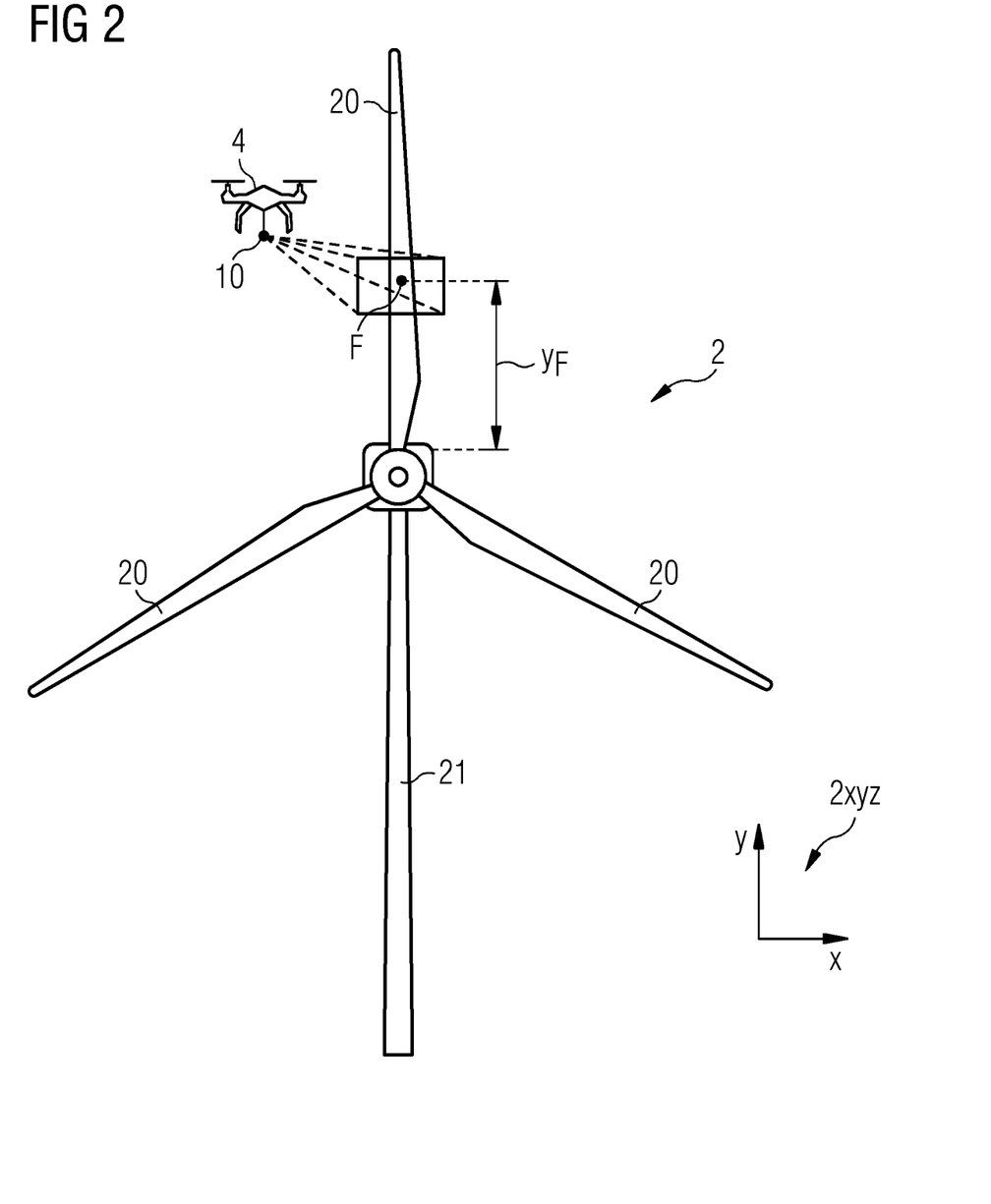
FIG. 2 shows an implementation of the inventive method.

FIG. 2 shows an implementation of the inventive method. Here, a camera-carrying drone 4 is used to collect images 10$i$ of a rotor blade 20. The rectangular bounding box indicates an exemplary field of view of the camera 10. In addition to the camera 10, the drone 4 can also carry the metadata generators GM1, GM2, GM3 described above, so that metadata GM_xyz, GM_$\theta$, GM_$\psi$, GM_$\varphi$, GM_d of an image 10$i$ is defined relative to a main reference frame 2xyz. Here, a vertical such as the longitudinal axis of the wind turbine tower 21 may serve as a principal axis (the Y-axis in this case) of the main reference frame 2xyz. The images 10$i$ may be used to identify a defect F on the rotor blade surface and to report its location $y_F$ relative to the rotor blade root 2R.

Figure 3:
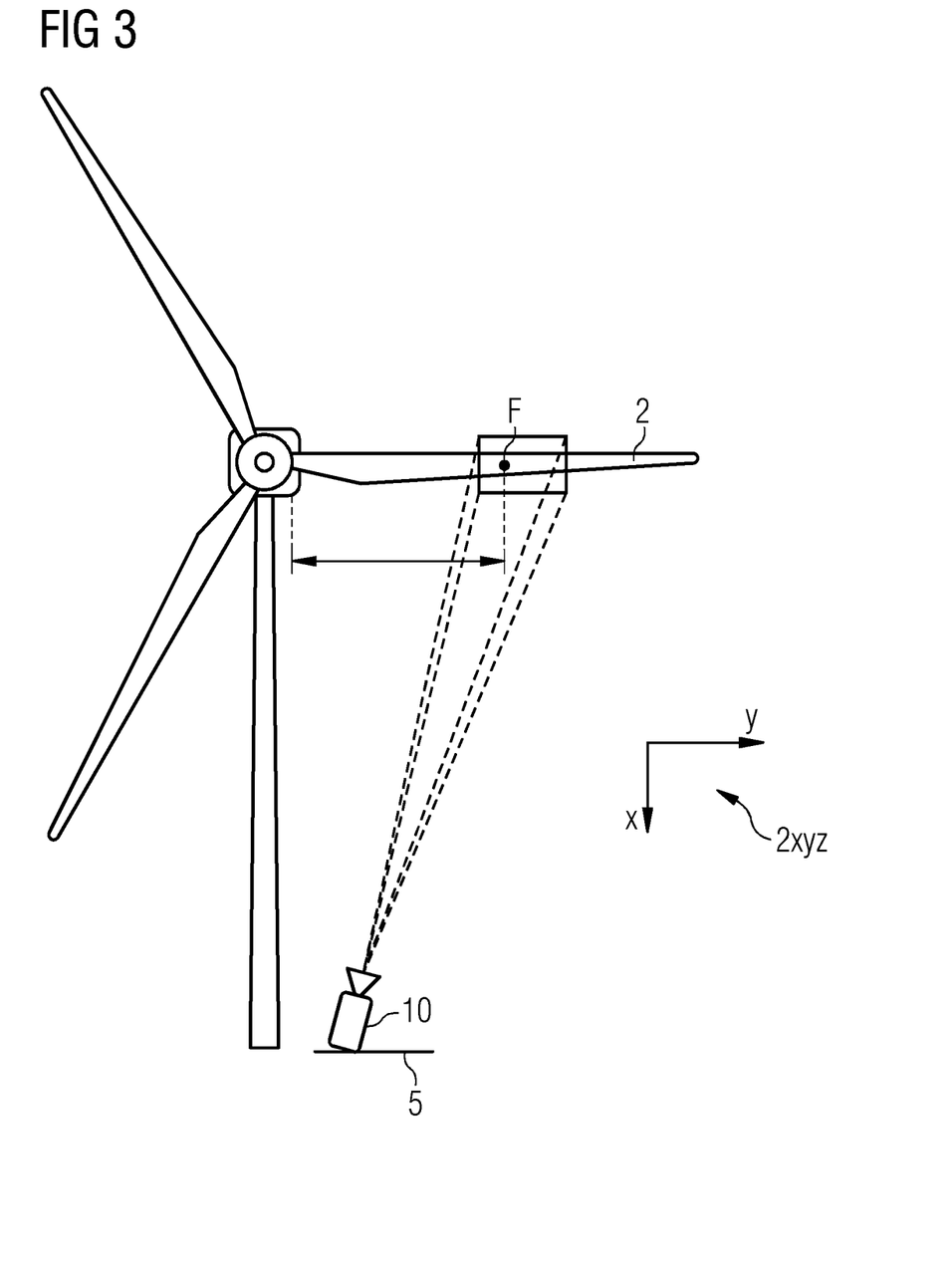
FIG. 3 shows an further implementation of the inventive method.

FIG. 3 shows an further implementation of the inventive method. Here, a camera assembly is mounted to a fixed support 5, so that the camera coordinates GM_xyz remain constant. Again, the rectangular bounding box indicates an exemplary field of view of the camera 10. The camera assembly may be assumed to also include the metadata generators GM1, GM2, GM3 described above, so that metadata GM_xyz, GM_$\theta$, GM_$\psi$, GM_$\varphi$, GM_d of an image 10$i$ is defined relative to a main reference frame 2xyz. Here, a horizontal such as the longitudinal axis of the rotor blade being imaged may serve as a principal axis of the main reference frame 2xyz.

Figure 4:
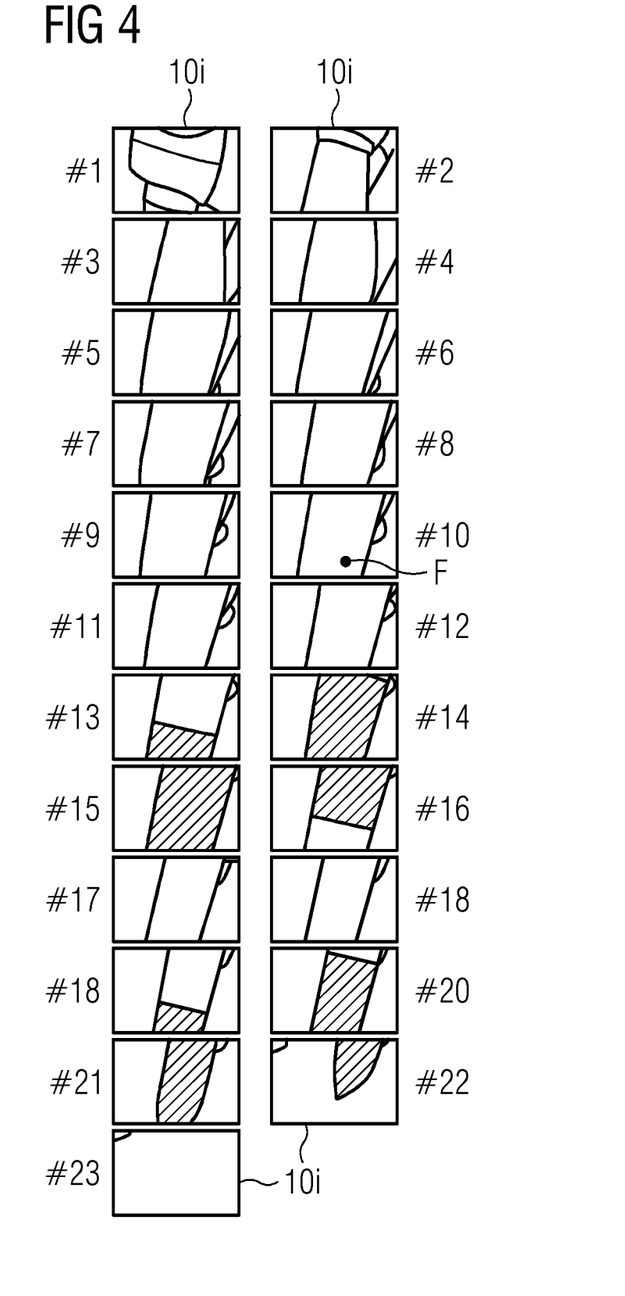
FIG. 4 is a simplified schematic of a plurality of images of a rotor blade surface.

FIG. 4 is a simplified schematic of a plurality of images 10$i$ of a rotor blade surface 20S, collected by a camera 10 as described in FIG. 2 or FIG. 3, for example. In this exemplary embodiment, 23 images 10i are shown, labelled #1 to #23. Each image 10i shows a portion of the rotor blade 2, and in this case each image also shows some background. While the images are arranged in a root-to-tip sequence for clarity, the inventive method does not require that the images 10i be captured in that order.

The diagram also indicates a "finding" F or anomaly in an image 10i. One aspect of wind turbine maintenance is how to identify defects on the rotor blade in order to assess the severity of damage and whether repair is necessary.

Figure 5:
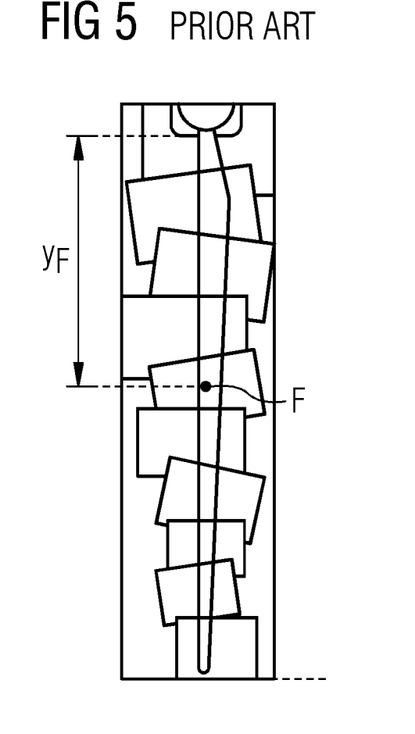
FIG. 5 is a simplified schematic showing the result of a conventional image stitching procedure.

A conventional art approach may rely on global GPS coordinates (without reference to the wind turbine's location) and/or time-stamps to identify the correct order of the images prior to "stitching" them together so that the location of a defect F may be estimated. Another approach may be to identify common regions of adjacent images. For example, the light/dark transition in image #19 and image #20 might be used as a basis from which to "stitch" these images together. Image features can also be problematic, for example the foundation structure is visible in each of the images labelled #5-#12, since these images were all collected at different viewing angles and at different distances to the rotor blade. For these reasons, a conventional art technique that relies on global GPS coordinates (without reference to the wind turbine's location) can be quite inaccurate, since it is difficult to identify the correct arrangement of the images in order to "stitch" them together. The cumulative error that accrues during the image-stitching procedure means that the reported location of a defect may differ significantly from its actual location. This means that a reported position of a defect F—e.g., its estimated distance $y_F$ from the root—may be off by a significant amount. When (at a later stage) a service technician abseils from the hub to inspect/repair the defect, the erroneous reported position can result in long delays while the technician searches for the defect, and additional service costs.

Figure 6:
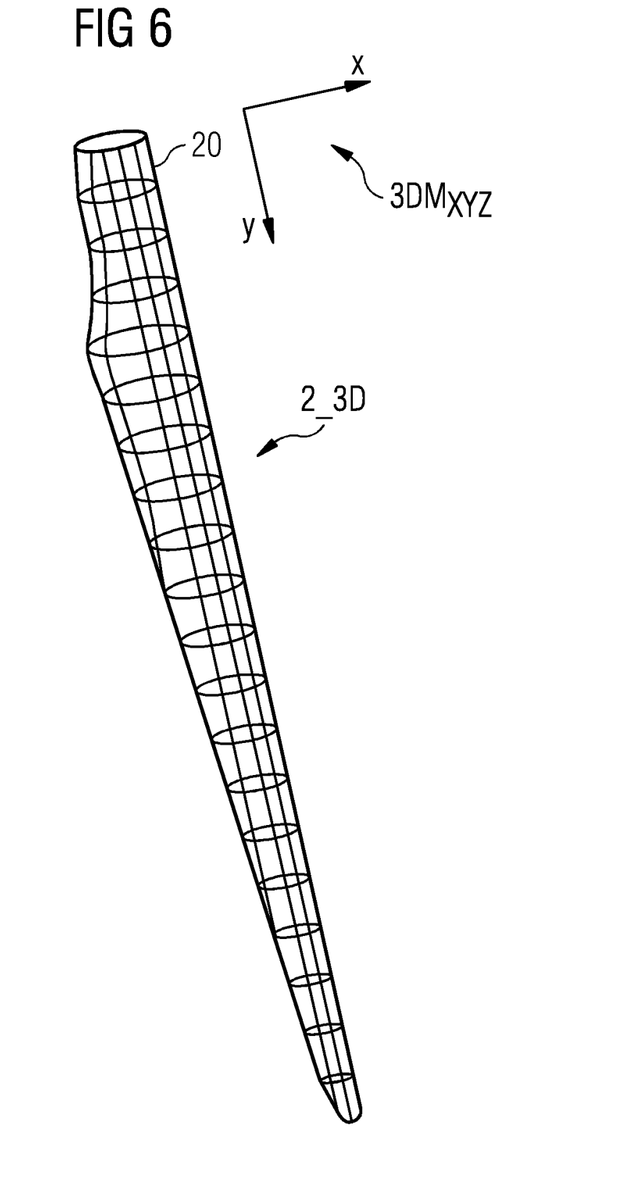
FIG. 6 is a simplified schematic of a rotor blade model generated during the inventive method.

The inventive method takes a different approach, as explained in the following:

FIG. 6 is a simplified schematic of a rotor blade model 2_3D generated by the inventive imaging arrangement 1. Here, the model 2_3D is a boundary model built on the basis of the geometry metadata GM_xyz, GM_θ, GM_ψ, GM_φ, GM_d of a plurality of augmented images 10i_GM as explained in FIG. 1 above. The images 10i will now be re-projected according to a desired re-projection scheme, for example to re-project all images 10i in a plane that is parallel to the rotor blade long axis, and at a certain distance from the rotor blade. From a reference frame $3DM_{XYZ}$ of the model 2_3D and the geometry metadata GM_xyz, GM_θ, GM_ψ, GM_φ, GM_d of an image 10i, a homograph transformation matrix 10i HM is compiled for each image 10i. When applied to an image 10i, the homograph transformation matrix 10i HM will re-project or transform that image according to the re-projection scheme.

Figure 7:
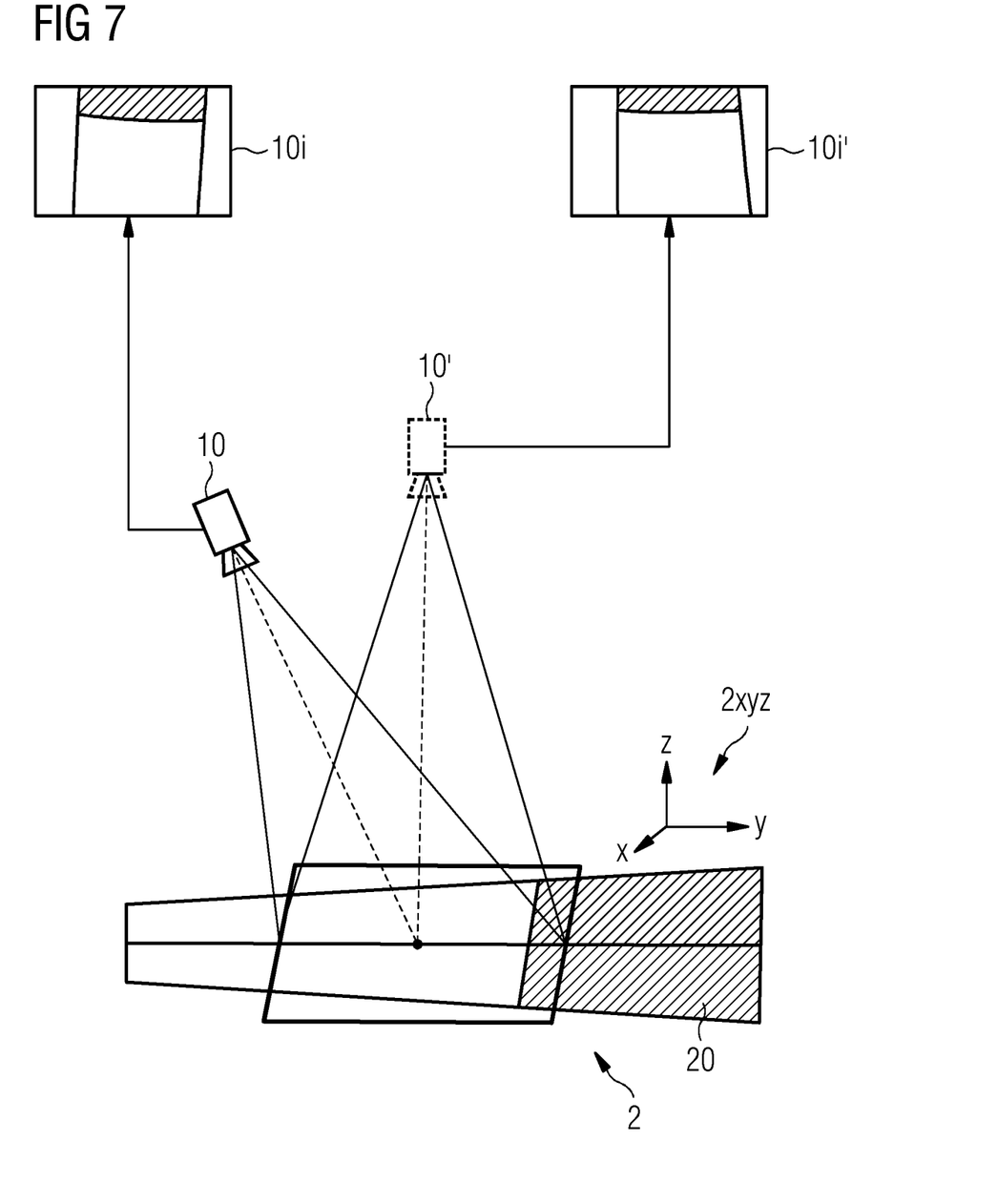
FIG. 7 illustrates the principle of homograph transformation applied by the inventive method.

This is illustrated in FIG. 7, which shows a camera 10 in the process of capturing an image 10i of a region of the rotor blade 2. Various sensors (not shown) of the camera 10 record its position GM_xyz in a reference frame, its Euler angles GM_θ, GM_ψ, GM_φ, and the distance to the rotor blade surface GM_d. Using this information along with the 3D model, as explained in FIG. 1, a homograph transformation matrix 10i HM can be compiled for that image 10i so that the image can be re-projected according to the chosen re-projection scheme. The re-projected image will appear as though taken from a virtual camera 10' with all Euler angles at 0° and at a specific distance from the rotor blade 2. The original image 10i shown in the top left, distorted because of the camera's orientation relative to the blade 2, can then appear "correctly" after re-projection as shown in the top right of the diagram.

Figure 8:
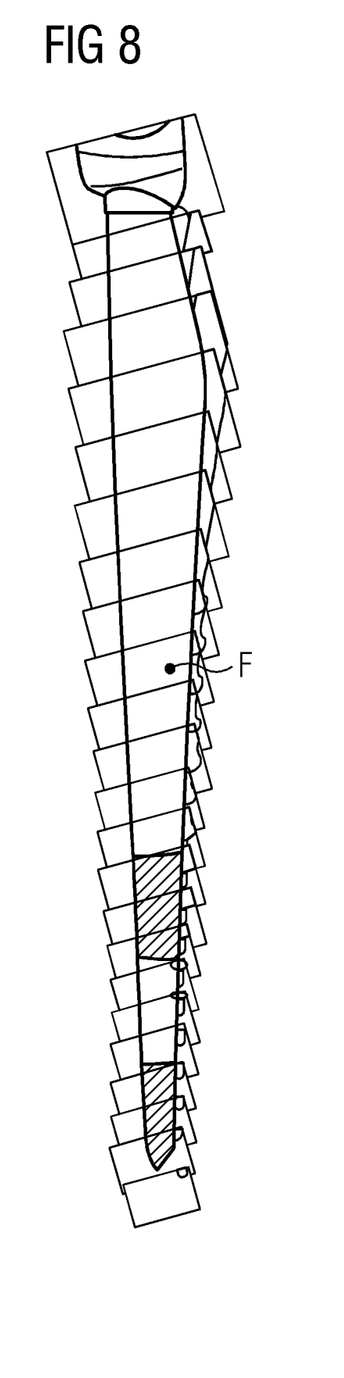
FIG. 8 is a simplified schematic of a composite reprojection image of a rotor blade generated by the inventive imaging arrangement.

This homograph transformation and re-projection is done for all images 10i, and the resulting cumulative image 2_rpi of the rotor blade 2 is shown in FIG. 8. Because of the precise geometry metadata GM_xyz, GM_θ, GM_ψ, GM_φ, GM_d provided with each image 10i and the associated precision of the model 2_3D, the image mapping step also results in a precise composite image 2_rpi. This composite image 2_rpi obtained using the inventive method clearly shows that background features visible in multiple images taken from different viewing angles have no effect on the image stitching. The diagram shows that the dimensions of the rotor blade 2 in the composite re-projected image 2_rpi correspond to the dimensions of the actual rotor blade 2. This means that a reported position of a defect F is favorably accurate, so that (at some later stage) an inspection technician can go directly to the defect, avoiding unnecessary costs.

Figure 9:
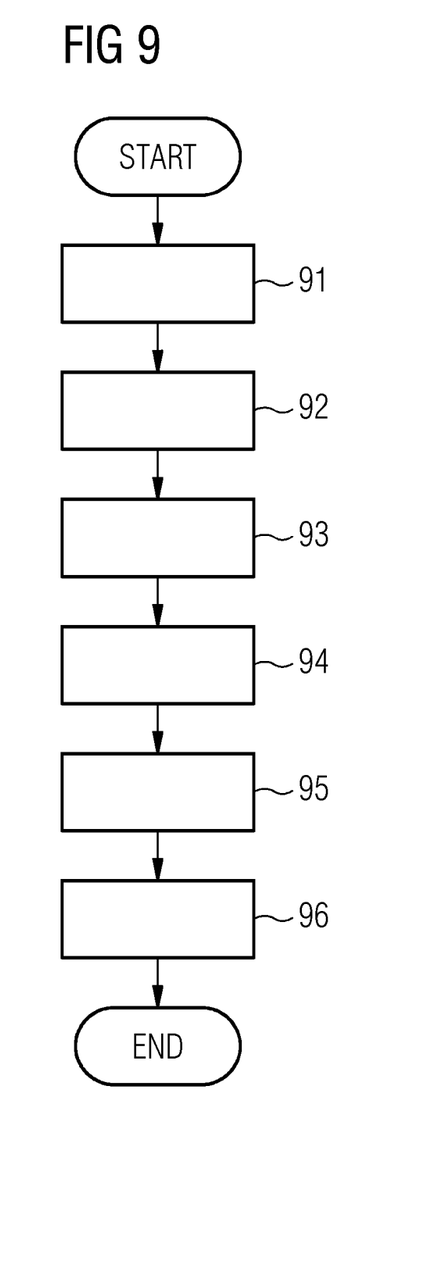
FIG. 9 is a flowchart illustrating steps of the inventive method.

FIG. 9 is a flowchart illustrating steps of the inventive method. In a first step 91, the input data is collected, i.e., the plurality of images 10i collected for a rotor blade surface, and the geometry metadata GM_xyz, GM_θ, GM_ψ, GM_φ, GM_d of each image 10i. In a subsequent step 92, a reference frame or coordinate system 2xyz is defined for the rotor blade. In a subsequent step 93, a 3D model 2_3D is constructed from the geometry metadata of the images. In a subsequent step 94, homograph transformation matrices 10i HM are compiled for the images, which are then re-projected onto a common plane. In step 95, each re-projected image is aligned in the reference frame of the rotor blade, i.e., to "line up" the image correctly relative to a fixed reference such as the blade root. To this end, a neural network 13_NN can be applied to assist in correct alignment. In a subsequent step 96, a composite re-projection image 2_rpi is output for the entire rotor blade.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of imaging a wind turbine rotor blade, the method comprising:
controlling a camera to capture a plurality of images, each image showing a part of a rotor blade surface;
augmenting each image with geometry metadata;
generating a three-dimensional model of the rotor blade from the image metadata;
re-projecting the images on a basis of the three-dimensional model to obtain a composite re-projection image of the rotor blade, wherein the re-projecting the images is assisted by a neural network that automatically determines an alignment of the images relative to a fixed reference point of the rotor blade, wherein the re-projecting comprises applying a homograph matrix to each image to re-project the images onto a same plane and at a uniform scale to realign each re-projected image to be at a same distance from a principle axis of the rotor blade; and using the composite re-projected image of the rotor blade to identify a defect in the rotor blade surface.

2. The method according to claim 1, wherein the homograph matrix of an image is compiled on the basis of geometry metadata of that image.

3. The method according to claim 1, wherein the neural network automatically determines which end of an image is closest to the fixed reference point.

4. The method according to claim 1, wherein the neural network is pre-trained using a plurality of annotated datasets.

5. The method according to claim 1, wherein geometry metadata of an image comprises the spatial coordinates of the camera at an instant of image capture, and/or comprises a camera viewing angle at the instant of image capture.

6. The method according to claim 1, wherein geometry metadata of an image comprises a distance between the camera and the rotor blade surface at an instant of image capture.

7. The method according to claim 1, further comprising mapping an image feature to a coordinate system of the rotor blade.

8. A wind turbine rotor blade imaging arrangement, comprising:
a camera configured to capture a plurality of images, each image showing part of a rotor blade surface; and
one or more processors configured to:
generate geometry metadata for an image;
augment each image with the geometry metadata provided by the plurality of metadata generators;
generate a three-dimensional model of the rotor blade from the image metadata of the images; and
re-project the images on a basis of the three-dimensional model to obtain a composite re-projection image of the rotor blade, wherein a neural network trained to automatically determine an alignment of the images relative to a fixed reference point of the rotor blade, wherein obtaining the composite reprojection comprises applying a homograph matrix to each image to re-project the images onto a same plane and at a uniform scale to realign each re-projected image to be at a same distance from a principle axis of the rotor blade.

9. The imaging arrangement according to claim 8, wherein the neural network automatically determines which end of an image is closest to the fixed reference point.

10. The imaging arrangement according to claim 8, wherein the plurality of metadata generators comprises a position tracking unit configured to obtain camera spatial coordinates and/or a viewing angle tracking unit configured to obtain a camera viewing angle and/or a range-finding unit configured to measure a distance between the camera and rotor blade surface.

11. The imaging arrangement according to claim 8, comprising a camera controller configured to adjust a position of the camera and/or an orientation of the camera and/or a focal length of the camera.

12. The imaging arrangement according to claim 8, configured to identify a finding in an image and to determine coordinates of the finding in a reference frame of the rotor blade.

13. The imaging arrangement according to claim 8, wherein the camera is carried by a drone, and/or the camera is mounted on a fixed track.

14. A computer program product, comprising a computer readable hardware storage device having computer readable program code stored therein, said program code executable by a processor of a computer system to implement a method according to claim 1 when the computer program product is loaded into a memory of a programmable device.

15. The method according to claim 1, wherein the step of re-projecting the images comprises re-projecting the images at the same scale and viewing angle on the basis of the three-dimensional model to obtain the composite re-projection image of the rotor blade.

16. The method according to claim 1, wherein the three-dimensional model provides a reference frame from which to carry out the re-projection of the images for accurately relate any pixel of a specific image to a point on the re-projected composite image.

17. The method according to claim 1, comprising the step of identifying a defect on the rotor blade surface by applying an image processing algorithm configured to detect color anomalies and/or edge anomalies.

18. A wind turbine rotor blade imaging arrangement comprising a camera and one or more processors configured for performing the method according to claim 1.

* * * * *